US012159096B1

(12) United States Patent
Penfield et al.

(10) Patent No.: US 12,159,096 B1
(45) Date of Patent: Dec. 3, 2024

(54) SYSTEM AND METHOD FOR PROCESSING ENVIRONMENTAL, SOCIAL, AND GOVERNANCE REPORTS

(71) Applicant: VelocityEHS Holdings Inc., Chicago, IL (US)

(72) Inventors: Julia Penfield, Seattle, WA (US); Pulkit Trushantkumar Parikh, Toronto (CA)

(73) Assignee: VELOCITYEHS HOLDINGS, INC., Chicago, IL (US)

( * ) Notice: Subject to any disclaimer, the term of this patent is extended or adjusted under 35 U.S.C. 154(b) by 8 days.

(21) Appl. No.: 18/479,488

(22) Filed: Oct. 2, 2023

(51) Int. Cl.
| | |
|---|---|
| *G06F 40/106* | (2020.01) |
| *G06F 40/284* | (2020.01) |
| *G06F 40/295* | (2020.01) |
| *G06Q 10/0639* | (2023.01) |

(52) U.S. Cl.
CPC .......... *G06F 40/106* (2020.01); *G06F 40/284* (2020.01); *G06F 40/295* (2020.01); *G06Q 10/0639* (2013.01)

(58) Field of Classification Search
CPC .... G06F 40/106; G06F 40/284; G06F 40/295; G06Q 10/0639
See application file for complete search history.

(56) References Cited

U.S. PATENT DOCUMENTS

| | | | | |
|---|---|---|---|---|
| 10,347,146 | B2 * | 7/2019 | Clark | G06F 16/3329 |
| 11,243,955 | B2 * | 2/2022 | Ackermann | G06F 16/3329 |
| 11,488,075 | B1 * | 11/2022 | Farooq | G06Q 10/04 |
| 11,797,611 | B2 * | 10/2023 | Yu | G06N 3/096 |
| 2015/0161130 | A1 * | 6/2015 | Liu | G06F 40/106 |
| | | | | 707/723 |
| 2016/0078102 | A1 * | 3/2016 | Crouch | G06F 16/313 |
| | | | | 707/722 |
| 2016/0179934 | A1 * | 6/2016 | Stubley | G06F 16/243 |
| | | | | 707/722 |
| 2018/0121394 | A1 * | 5/2018 | Denoue | G06F 40/106 |
| 2018/0365318 | A1 * | 12/2018 | Yi | G06F 16/334 |
| 2019/0079934 | A1 * | 3/2019 | Liao | G06F 16/248 |

(Continued)

OTHER PUBLICATIONS

Kim Jong Woong, "Method For Establishing ESG Database With Structured ESG Data Using ESG Auxiliary Tool And ESG Service Providing System Performing the Same", published on May 12, 2023, Document ID KR 102532216 B1, pp. 20 (Year: 2023).*

(Continued)

*Primary Examiner* — Chau T Nguyen
(74) *Attorney, Agent, or Firm* — K&L Gates LLP

(57) ABSTRACT

A computing device of a system is deployed within a communication network for processing environmental, social, and governance (ESG) reports. The computing device is configured to obtain an ESG report of an entity, receive a question in natural language regarding information contained in or inferable from the ESG report, convert the ESG report into page-wise pieces of text, determine an answer to the question based at least upon the page-wise pieces of text of the ESG report, determine a location of a snippet related to the answer in the page-wise pieces of text of the ESG report, generate a bounding box through which the snippet is highlighted in a page containing the snippet, crop the page based on the bounding box, and display a cropped image of the page.

30 Claims, 7 Drawing Sheets

(56) References Cited

U.S. PATENT DOCUMENTS

| | | | |
|---|---|---|---|
| 2019/0279136 A1* | 9/2019 | Gershenson | G06Q 10/06395 |
| 2021/0011921 A1* | 1/2021 | Dai | G06F 16/3344 |
| 2022/0019624 A1* | 1/2022 | Gwozdz | G06F 40/295 |
| 2022/0245467 A1* | 8/2022 | Mukherjee | G06F 16/2228 |
| 2022/0261819 A1* | 8/2022 | Litvak-Hinenzon | G06Q 30/018 |
| 2022/0269713 A1* | 8/2022 | Wang | G06F 16/345 |
| 2022/0300545 A1* | 9/2022 | Shaw | G06Q 30/0282 |
| 2023/0012063 A1* | 1/2023 | Yu | G06F 16/3329 |

OTHER PUBLICATIONS

Kim Jong Woong, "Method For Recommending Suitable Texts To Auto-complete ESG Documents and ESG Service Providing System Performing The Same", published on September, 6, 2023, Document ID: KR 102574784 B1, pp. 19 (Year: 2023).*

Kim Jong Woong, "Method for establishing ESG database with structured ESG data using ESG auxiliary tool and ESG service providing system performing the same", published on May 12, 2023, Document ID: KR-102532216-B1, pp. 25. (Year: 2023).*

Brown et al., "Providing Question Answer Of Collecting Answer from a Plurality of Document Sections", published on May 29, 2023, Document ID: CN 103124980 A, pp. 25. (Year: 2013).*

* cited by examiner

| | |
|---|---|
| Question | Scope 1 GHG emissions —502 |
| Report | Alaska_2020.pdf —504 |
| Answer | 5,936,459 Metric tons CO2e —506 |
| Cropped Page | ble Accounting Standards Board) Data for 2021: Alaska Air Group —508 ... |

| | |
|---|---|
| Question | Sector(s) —518 |
| Report | Abbott_Laboratories_2021.pdf —510 |
| Answer | nutrition, pharmaceuticals, medical devices, diagnostics —514 |
| Cropped Page | ... (nutrition, pharmaceuticals, medical devices, diagnostics) ... —522 |

| | |
|---|---|
| Question | Annual Revenue —520 |
| Report | Royal_Bank_2022.pdf —512 |
| Answer | $49.0 billion —516 |
| Cropped Page | ...In 2022, we earned revenue of $49.0 billion and distributed $35.9 billion... —524 |

FIG. 5

| | |
|---|---|
| Question | Geographic Locations |
| Report | CF_Industries_2020.pdf |
| Answer | The company operates in the United States, Canada, and the United Kingdom. |
| Cropped Page | 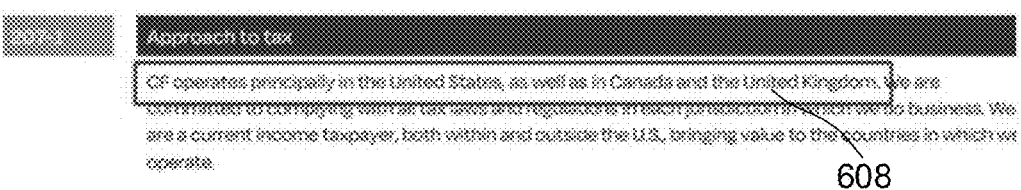 |
| Question | Has greenhouse gas emissions reduction targets? |
| Report | Home_Depot_2022.pdf |
| Answer | Yes |
| Cropped Page | 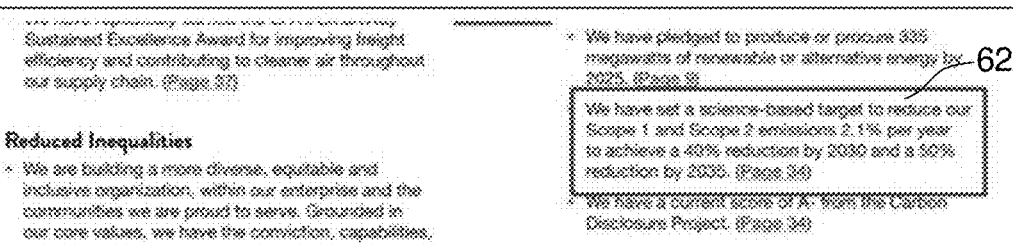 |
| Question | % Female employees |
| Report | AES_Corporation_2020.pdf |
| Answer | 38% |
| Cropped Page | 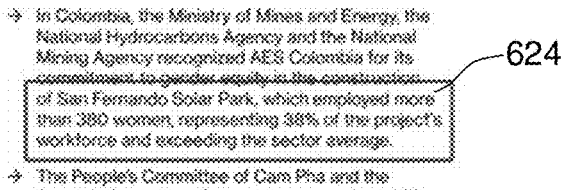 |
FIG. 6

SYSTEM AND METHOD FOR PROCESSING ENVIRONMENTAL, SOCIAL, AND GOVERNANCE REPORTS

FIELD OF TECHNOLOGY

The present disclosure generally relates to a system and method for processing environmental, social, and governance (ESG) reports, and more particularly relates to a system and method that automatically generate, locate, and highlight an answer to a question from an ESG report.

BACKGROUND

Environmental, social, and governance reporting is a type of corporate disclosure that details the environmental, social and governance promises, efforts, and progress of an organization. Although organizations are regularly required to report financial and operational performance attributes, ESG reporting may provide an accurate account of efforts undertaken and the expected impact of those efforts from both a qualitative and quantitative perspective with various ESG datasets. For example, certain ESG data may relate to factors that were traditionally absent in a financial analysis, such as company management of energy and water use, waste generation, employee rights and working conditions, community engagement, data privacy rights, corporate accountability, and transparency. Much like an annual report or other forms of corporate disclosure, an ESG report is a communication tool that can help an organization provide information and insights to employees, investors, other stakeholders, and regulatory authorities.

ESG reporting can be a complex and time-consuming task. As with any type of corporate disclosure, there is a need for accuracy and diligence on data that is reported. In some examples, an ESG report may contain a large amount of information spanning well over 50 pages. Therefore, manually answering questions entails considerable human effort and time. Moreover, given that ESG is a niche domain, it takes a team of people with special expertise to carry out this manual exercise.

Accordingly, there is a need for a system that can automatically generate, locate and highlight an answer to a question from an ESG report.

SUMMARY

Among other features, the present disclosure provides a system deployed within a communication network for processing ESG reports. For example, the system may include a computing device comprising a non-transitory computer-readable storage medium storing instructions; and a processor coupled to the non-transitory computer-readable storage medium. The processor is configured to execute the instructions to: obtain an ESG report of an entity, receive a question in natural language regarding information contained in or inferable from the ESG report, convert the ESG report into page-wise pieces of text, determine an answer to the question based at least upon the page-wise pieces of text of the ESG report, determine a location of a snippet related to the answer in the page-wise pieces of text of the ESG report, generate a bounding box through which the snippet is highlighted in a page containing the snippet in the page-wise pieces of text of the ESG report, crop the page based on the bounding box through which the snippet is highlighted, and display a cropped image of the page including the bounding box through which the snippet is highlighted.

In an embodiment, the processor of the computing device may be configured to analyze the question and determine a type of the answer to the question, wherein the type includes at least one of a textual answer, a numeric answer, and a binary answer. The processor may be further configured to convert the ESG report into the page-wise pieces of text via optical character recognition techniques.

In some implementations, the processor may determine the answer to the question by at least: using a tokenizer to transform the question and the page-wise pieces of text of the ESG report into a sequence of tokens; in response to detecting that a length of the sequence of tokens is greater than a selected threshold sequence length value of the system, dividing the sequence of tokens into subsequences, each subsequence being shorter than the selected threshold sequence length value; inputting the sequence of tokens or the subsequences into a pre-trained transformer model to generate a first score for a likelihood of each token being a start token of the snippet and a second score for a likelihood of each token being an end token of the snippet; generating answer snippet candidates based at least upon the first and second scores; and determining a best snippet candidate answering the question based at least upon the first and second scores. The processor of the computing device may generate the answer snippet candidates by filtering out candidates fail to match the type of the answer.

In other embodiments, the processor may be configured to perform a sentiment analysis on the best snippet candidate in response to detecting that the type of the answer is the binary answer by at least employing the pre-trained transformer model fine-tuned on a sentiment analysis dataset, calculate probabilities for positive and negative sentiment labels, and identify a sentiment label for a candidate snippet with a highest probability as the binary answer to the question.

The processor of the computing device may process the best snippet candidate via at least named entity recognition techniques.

In yet another embodiment, the processor of the computing device may determine the answer to the question by at least: simultaneously identifying and extracting pages from the page-wise pieces of text of the ESG report containing information related to the question; generating a JavaScript Object Notation (JSON) object with keys corresponding to the answer and texts in the pages answering the question; generating an overall report summary of the pages as a part of the JSON object based on a selected word count threshold; and inputting the overall report summary to a pre-trained transformer-based chat model to generate the answer to the question and the snippet providing the answer. The selected word count threshold may be determined based upon a token limit of the pre-trained transformer-based chat model.

In addition, the processor may set a tunable parameter of the pre-trained transformer-based chat model in order to generate responses maximally deterministic in certain embodiments.

The processor may also be configured to extract the page containing the snippet as an image, convert the image into text while tracking minimum bounding boxes of all word occurrences corresponding to the snippet, and represent a minimum bounding box of each word occurrence based on image coordinates of a left-top corner of each word occurrence and a height and width of a sequence of words in each word occurrence in the image.

In accordance with other aspects, the present disclosure relates to a computer-implemented method, comprising: obtaining, by a processor of a computing device deployed within a communication network, an ESG report of an entity; receiving a question in natural language regarding information contained in or inferable from the ESG report; converting the ESG report into page-wise pieces of text; determining an answer to the question based at least upon the page-wise pieces of text of the ESG report; determining a location of a snippet related to the answer in the page-wise pieces of text of the ESG report; generating a bounding box through which the snippet is highlighted in a page containing the snippet in the page-wise pieces of text of the ESG report; cropping the page based on the bounding box through which the snippet is highlighted; and displaying a cropped image of the page including the bounding box through which the snippet is highlighted.

The computer-implemented method may further comprise analyzing the question and determining a type of the answer to the question, wherein the type includes at least one of a textual answer, a numeric answer, and a binary answer.

In an important aspect, the computer-implemented method may comprise converting the ESG report into the page-wise pieces of text via optical character recognition techniques.

In determining the answer to the question, the method may comprise using a tokenizer to transform the question and the page-wise pieces of text of the ESG report into a sequence of tokens; in response to detecting that a length of the sequence of tokens is greater than a selected threshold sequence length value of the system, dividing the sequence of tokens into subsequences, each subsequence being shorter than the selected threshold sequence length value; inputting the sequence of tokens or the subsequences into a pre-trained transformer model to generate a first score for a likelihood of each token being a start token of the snippet and a second score for a likelihood of each token being an end token of the snippet; generating answer snippet candidates based at least upon the first and second scores; filtering out candidates fail to match the type of the answer; and determining a best snippet candidate answering the question based at least upon the first and second scores.

In some embodiments, the method may comprise performing a sentiment analysis on the best snippet candidate in response to detecting that the type of the answer is the binary answer by at least employing the pre-trained transformer model fine-tuned on a sentiment analysis dataset; calculating probabilities for positive and negative sentiment labels; and identifying a sentiment label for a candidate snippet with a highest probability as the binary answer to the question.

The computer-implemented method may also process the best snippet candidate via at least named entity recognition techniques in certain embodiments.

In determining the answer to the question, the method may further comprise simultaneously identifying and extracting pages from the page-wise pieces of text of the ESG report containing information related to the question; generating a JSON object with keys corresponding to the answer and texts in the pages answering the question; generating an overall report summary of the pages as a part of the JSON object based on a selected word count threshold, wherein the selected word count threshold is determined based upon a token limit of a pre-trained transformer-based chat model; and inputting the overall report summary to the pre-trained transformer-based chat model to generate the answer to the question and the snippet providing the answer.

Moreover, the method may comprise setting a tunable parameter of the pre-trained transformer-based chat model in order to generate responses maximally deterministic.

Additionally, the computer-implemented method may further comprise extracting the page containing the snippet as an image; converting the image into text while tracking minimum bounding boxes of all word occurrences corresponding to the snippet; and representing a minimum bounding box of each word occurrence based on image coordinates of a left-top corner of each word occurrence and a height and width of a sequence of words in each word occurrence in the image.

In accordance with further aspects, the present disclosure relates to a non-transitory computer readable medium storing instructions which when executed cause a processor of a computing device of a system deployed within a communication network to: obtain an ESG report of an entity; receive a question in natural language regarding information contained in or inferable from the ESG report; convert the ESG report into page-wise pieces of text; determine an answer to the question based at least upon the page-wise pieces of text of the ESG report; determine a location of a snippet related to the answer in the page-wise pieces of text of the ESG report; generate a bounding box through which the snippet is highlighted in a page containing the snippet in the page-wise pieces of text of the ESG report; crop the page based on the bounding box through which the snippet is highlighted, and display a cropped image of the page including the bounding box through which the snippet is highlighted.

The non-transitory computer readable medium may further comprise instructions causing the processor to analyze the question and determine a type of the answer to the question, wherein the type includes at least one of a textual answer, a numeric answer, and a binary answer.

When determining the answer to the question, the non-transitory computer readable medium may further comprise instructions causing the processor to convert the ESG report into the page-wise pieces of text via optical character recognition techniques; use a tokenizer to transform the question and the page-wise pieces of text of the ESG report into a sequence of tokens; in response to detecting that a length of the sequence of tokens is greater than a selected threshold sequence length value of the system, divide the sequence of tokens into subsequences, each subsequence being shorter than the selected threshold sequence length value; input the sequence of tokens or the subsequences into a pre-trained transformer model to generate a first score for a likelihood of each token being a start token of the snippet and a second score for a likelihood of each token being an end token of the snippet; generate answer snippet candidates based at least upon the first and second scores; filter out candidates fail to match the type of the answer; and determine a best snippet candidate answering the question based at least upon the first and second scores.

The non-transitory computer readable medium may also comprise instructions causing the processor to: perform a sentiment analysis on the best snippet candidate in response to detecting that the type of the answer is the binary answer by at least employing the pre-trained transformer model fine-tuned on a sentiment analysis dataset; calculate probabilities for positive and negative sentiment labels; and identify a sentiment label for a candidate snippet with a highest probability as the binary answer to the question.

In some other embodiments, the processor may execute instructions to process the best snippet candidate via at least named entity recognition techniques.

When determining the answer to the question, the processor may execute instructions to simultaneously identify and extract pages from the page-wise pieces of text of the ESG report containing information related to the question; generate a JSON object with keys corresponding to the answer and texts in the pages answering the question; generate an overall report summary of the pages as a part of the JSON object based on a selected word count threshold, wherein the selected word count threshold is determined based upon a token limit of a pre-trained transformer-based chat model; set a tunable parameter of the pre-trained transformer-based chat model in order to generate responses maximally deterministic; and input the overall report summary to the pre-trained transformer-based chat model to generate the answer to the question and the snippet providing the answer.

Additionally, the non-transitory computer readable medium may comprise instructions causing the processor to: extract the page containing the snippet as an image; convert the image into text while tracking minimum bounding boxes of all word occurrences corresponding to the snippet; and represent a minimum bounding box of each word occurrence based on image coordinates of a left-top corner of each word occurrence and a height and width of a sequence of words in each word occurrence in the image.

The above simplified summary of example aspects serves to provide an understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 5 illustrates answers generated by the first method of FIG. 3 using EQA with corresponding snippets located and highlighted, according to an exemplary aspect of the present disclosure;

FIG. 6 illustrates answers generated by the second method of FIG. 4 using a transformer based model with corresponding snippets located and highlighted, according to an exemplary aspect of the present disclosure.

DETAILED DESCRIPTION

Figure 1:
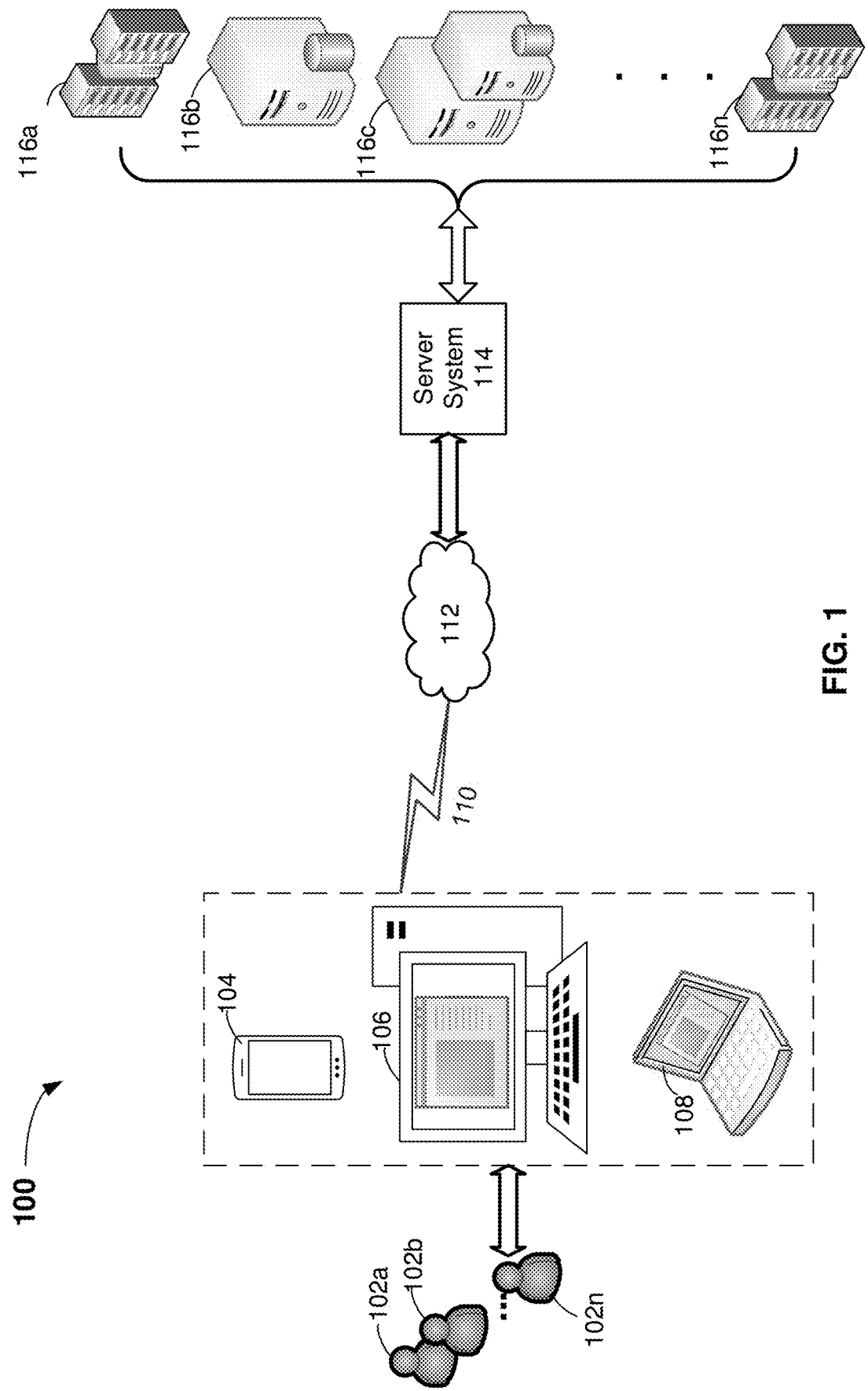
FIG. 1 illustrates an overall architecture of a computing system for processing ESG reports, according to an exemplary aspect of the present disclosure.

Various aspects of the present disclosure will be described with reference to the drawings, wherein like reference numerals are used to refer to like elements throughout. In the following description, for purposes of explanation, numerous specific details are set forth in order to promote a thorough understanding of one or more aspects of the present disclosure. It may be evident in some or all instances, however, that any aspects described below can be practiced without adopting the specific design details described below.

Among other features, the present disclosure provides a computing system configured to process various data and information related to an ESG report, automatically analyze a question from the ESG report, and generate a textual answer to the question. In one aspect, the disclosed system may be configured to locate and highlight a part of the ESG report that the answer is derived from in an image form of the report. One of the applications of the system of the present disclosure is to enable an ESG company to automate a part of the process of onboarding a new customer.

It should be appreciated that the disclosed system of the present disclosure is generic in terms of the documents it supports as well as the questions it can answer. That is, the disclosed system may be implemented as an automated question answering system in a closed domain or an open domain. The disclosed system may extract information from structured or unstructured knowledge bases to perform a closed domain question answering which may involve answering questions only from one domain, for example legal, medical, engineering, etc. In a preferred embodiment, the disclosed system may use a trained model configured to locate a relevant document to a query from any domain (i.e., an open domain) and extract relevant parts of the document via, e.g., natural language processing (NLP) techniques.

Referring to FIG. 1, in accordance with aspects of the present disclosure, a system 100 deployed within a server-based computing environment and communication network may be configured to process various data and information related to an ESG report and automatically generate, locate and highlight an answer to a question from the ESG report. A user of the system 100 (e.g., at least one of 102a, 102b . . . 102n) may access a server system 114 using a selected computing device or system 104, 106 or 108 via any suitable communication protocol 110 and network 112. The server system 114 may be configured to use machine learning, advanced NLP, and/or artificial intelligence technology to generate an answer to a question from an ESG report. For example, the selected computing device or system 104, 106 or 108 may run a web browser program to access one or more web pages served by the server system 114 and/or any available content provider or computing systems deployed within the system 100. If the network 112 is the Internet, the remote server system 114 may execute a web server process to provide hypertext markup language (HTML) documents, typically in the form of web pages, to one or more requesting computing devices of the system 100 via the network 112. Each computing device may access the Internet 112 through an Internet service provider (ISP). Data for any of the resources, services, web sites, and the like may be provided by a data store (e.g., one of 116a, 116b, 116c . . . 116n) closely or loosely coupled to any of the server system 114.

In some embodiments, the selected computing device or system 104, 106 or 108 may be configured to make one or more an application programming interface (API) calls through an API interface. For example, the server system 114 may include an API gateway device (not shown) configured to receive and process API calls from various connected computing devices deployed within the system 100 (e.g., an operating system, a library, a device driver, an API, an application program, software or other module). Such an API gateway device may specify one or more functions, methods, classes, objects, protocols, data structures, formats and/or other features of the server system 114 that may be used by the selected computing device or system 104, 106 or 108. For example, the API interface may define at least one calling convention that specifies how a function in the server system 114 receives parameters from, e.g., the computing device 104, 106 or 108 and how the function returns a result to these devices. As a result, in response to detecting that one of the computing devices 104, 106, or 108 makes an API call through the API interface to access and utilize the features of the server system 114 that are specified by the API interface, the server system 114 may return a value through the API interface to the requesting computing device. It should be appreciated that the server system 114 may include additional functions, methods, classes, data structures, and/or other features that are not specified through the API interface and are not available to a requesting computing device.

Each of the computing devices or systems 104, 106, 108 may comprise at least one of computing devices, servers, server farms, laptops, tablets, mobile devices, smart phones, smart watches, fitness tracker devices, cellular devices, gaming devices, media players, network enabled printers, routers, wireless access points, network appliances, storage systems, any suitable databases, gateway devices, smart home devices, virtual or augmented reality devices, or any other suitable devices that are deployed in the same or different communication networks of these computing devices and systems.

The server system 114, which may be Cloud-based or an on-site server, provides functionalities for any connected devices such as sharing data or provisioning resources among multiple client devices, or performing computations for each connected client device. The term "server" generally refers to a computing device or system, including processing hardware and process space(s), an associated storage medium such as a memory device or database, and, in some instances, at least one database application as is well known in the art. It should also be understood that "server system" and "server" are often used interchangeably herein.

The communication network 112 may generally include a geographically distributed collection of computing devices or data points interconnected by communication links and segments for transporting signals and data therebetween. The protocol(s) 110 may generally include a set of rules defining how computing devices and networks may interact with each other, such as frame relay, Internet protocol (IP), transmission control protocol (TCP), user datagram protocol (UDP), hypertext transfer protocol (HTTP). It should be appreciated that the system 100 of the present disclosure may use any suitable communication network, ranging from local area networks (LANs), wide area networks (WANs), cellular networks, to overlay networks and software-defined networks (SDNs), a packet data network (e.g., the Internet), mobile telephone networks (e.g., cellular networks, such as 4G or 5G), Plain Old Telephone (POTS) networks, and wireless data networks (e.g., Institute of Electrical and Electronics Engineers (IEEE) 802.11 family of standards known as Wi-Fi®, WiGig®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, virtual private networks (VPN), Bluetooth, Near Field Communication (NFC), or any other suitable network. In some embodiments, computing devices 104, 106 and 108 may be configured to communicate in a peer to peer manner to replace, duplicate, supplement or extend the functionalities of communication network 112.

If the system 100 is based on a Cloud-based computing architecture, the server system 114 may be configured to provide various Cloud computing services using shared resources. Cloud computing may generally include Internet-based computing in which computing resources are dynamically provisioned and allocated to each connected computing device or other devices on-demand, from a collection of resources available via the network or the Cloud. Cloud computing resources may include any type of resource, such as computing, storage, and networking. For instance, resources may include service devices (firewalls, deep packet inspectors, traffic monitors, load balancers, etc.), computing/processing devices (servers, CPUs, GPUs, random access memory, caches, etc.), and storage devices (e.g., network attached storages, storage area network devices, hard disk drives, solid-state devices, etc.). In addition, such resources may be used to support virtual networks, virtual machines, databases, applications, etc. The term "database," as used herein, may refer to a database (e.g., relational database management system (RDBMS) or structured query language (SQL) database), or may refer to any other data structure, such as, for example a comma separated values (CSV), tab-separated values (TSV), JavaScript Object Notation (JSON), eXtendible markup language (XML), TeXT (TXT) file, flat file, spreadsheet file, and/or any other widely used or proprietary format. In some embodiments, one or more of the databases or data sources may be implemented using one of relational databases, flat file databases, entity-relationship databases, object-oriented databases, hierarchical databases, network databases, NoSQL databases, and/or record-based databases.

Cloud computing resources accessible via any suitable communication network (e.g., Internet) may include a private Cloud, a public Cloud, and/or a hybrid Cloud. Here, a private Cloud may be a Cloud infrastructure operated by an enterprise for use by the enterprise, while a public Cloud may refer to a Cloud infrastructure that provides services and resources over a network for public use. In a hybrid Cloud computing environment which uses a mix of on-premises, private Cloud and third-party, public Cloud services with orchestration between the two platforms, data and applications may move between private and public Clouds for greater flexibility and more deployment options. Some example public Cloud service providers may include Amazon (e.g., Amazon Web Services® (AWS)), IBM (e.g., IBM Cloud), Google (e.g., Google Cloud Platform), and Microsoft (e.g., Microsoft Azure®). These providers provide Cloud services using computing and storage infrastructures at their respective data centers and access thereto is generally available via the Internet. Some Cloud service providers (e.g., Amazon AWS Direct Connect and Microsoft Azure ExpressRoute) may offer direct connect services and such connections typically require users to purchase or lease a private connection to a peering point offered by these Cloud providers.

The server system 114 (e.g., Cloud-based or an on-site server) of the present disclosure may be configured to connect with various data sources or services 116a, 116b, 116c, . . . 116n. Example data sources may include commercial data company's databases and third party data sources such as Green List, Global Diversity List, spend data, inquiry data, Global Archive, comprehensive global include at least one number. Similarly, an appropriate answer to a question with a binary answer type need not be limited to one word but must be binary semantically.

TABLE 1

| Question Category | Question Subcategory | Example Question | Answer Type |
|---|---|---|---|
| Company | Company information | Products & services | Text |
| | | Number of employees | Number |
| Environmental | Climate-related risks | Climate risks identified? | Yes/No |
| | Environmental Management System | Description of the Environmental Management System | Text |
| | Energy | Has energy reduction targets? | Yes/No |
| | GHG emissions | Scope 2 GHG emissions | Number |
| | | Has greenhouse gas emissions reduction targets? | Yes/No |
| | Regulatory | Environmental regulatory activity or fines? | Yes/No |
| | Waste | Has a recycling program? | Yes/No |
| ESG - General | Audit | Data audited by a 3rd party? | Yes/No |
| | External initiatives | Task force on climate-related financial disclosures? | Yes/No |
| | Awards | Company awards and recognitions | Text |
| | Report year | Report year | Number |
| Governance | Business continuity | Has a Disaster Recovery & Business Continuity plan? | Yes/No |
| | Business risks | Description of business risks | Text |
| | Ethics | Has a child worker policy? | Yes/No |
| | Executive compensation | Executive compensation tied to ESG/sustainability goals? | Yes/No |
| | IT | Description of the Information Security and Data Protection Management System | Text |
| | Product quality | Has a Quality Management System | Yes/No |
| | Board diversity | The % of female board members | Number |
| | Supplier management | Has a supplier management policy? | Yes/No |
| Social | Community service | Employee volunteer hours | Number |
| | Charitable contributions | Total charitable contributions | Number |
| | Diversity, Equity, Inclusion | The % of diverse employees in leadership roles | Number |
| | Employee development | Total employee training hours | Number |
| | Health and safety | Total Recordable Incident Rate | Number |
| | Labor standards | Has a working conditions policy? | Yes/No | database of business information, small business risk insights, CountryRisk, and greenhouse gases (GHG) emission. Public data sources may be included. For example, data may be obtained from government agencies (e.g., U.S. securities and exchange commission, U.S. environmental protection agency, the occupational safety and health administration, the excluded parties list system, and the office of foreign assets control) and United Nations sources, and may include Form 10-K, proxy statements, and annual reports. Another data source may include information obtained from company websites, for example, text contained in ESG-related URLs under company domains, and corporate social responsibility reports.

In one embodiment, 80 questions and 13 ESG reports, amounting to 1040 question-document pairs have been identified and input into the system 100 of the present disclosure. TABLE 1 below provides the categories of these diverse questions with illustrations. Each question is associated with an expected answer type, which may be text, number, or yes/no. The answer to a question with a numeric answer type need not comprise only numbers but must In response to obtaining an ESG report and a question, the server system 114 of the system 100 may be configured to automatically infer a textual answer to the question and highlight an excerpt from the ESG report that the answer is contained in or inferred from. The question answering system 100 of the present disclosure supports arbitrarily large ESG reports comprising over 100 pages, for instance. In addition to ESG related questions, the system 100 may be configured to answer questions seeking company information contained in the ESG report. In one embodiment, the highlighting of an answer-related excerpt may be performed by the server system 114 by generating a bounding box of the excerpt in the page containing it and displaying the bounding box in an appropriately cropped page.

Figure 2:
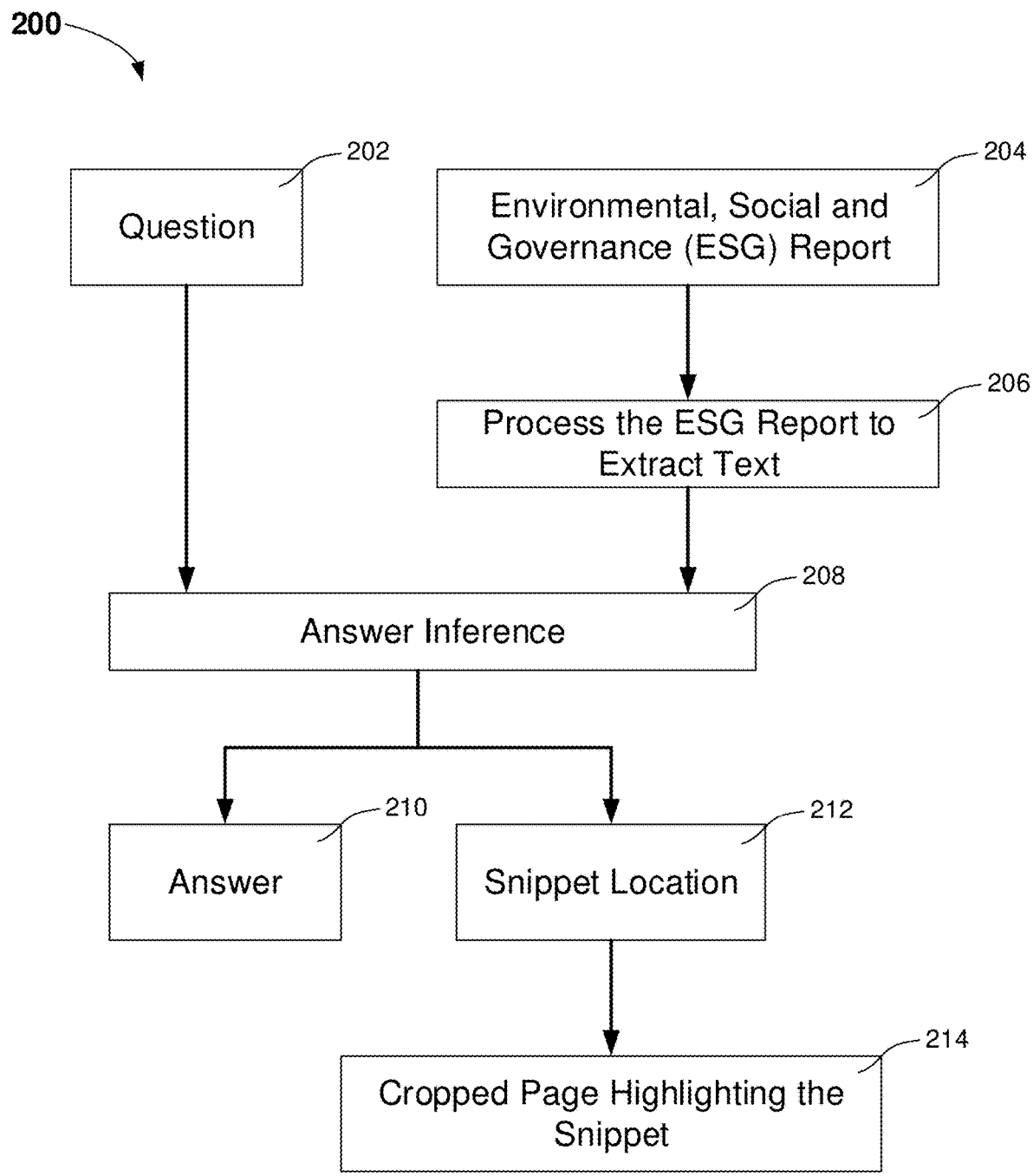
FIG. 2 illustrates a flowchart of a method performed by the computing system of FIG. 1, according to an exemplary aspect of the present disclosure.

FIG. 2 shows a flowchart 200 for a method carried out by the disclosed computing system 100 of FIG. 1 for an automatic answering of questions from considerable ESG reports via, e.g., machine learning and advanced NLP techniques, in accordance with aspects of the present disclosure. The main inputs to the system 100 may include a question 202 and an ESG report 204 which is processed 206 to extract text. In an embodiment, the server system 114 may be configured to use optical character recognition (OCR) techniques to convert the ESG report 202, which may be in the portable document format (PDF), into page-wise pieces of text (e.g., a list of text with page numbers). If the report PDF was digitally generated, OCR may be complemented or replaced by text extraction. It should be appreciated that the server system 114 may use any suitable technologies and/or techniques (e.g., pattern recognition, machine learning, artificial intelligence algorithms etc.) to scan an ESG report, identify individual characters in the ESG report, and convert the characters into digital text (e.g., page-wise pieces of text).

In an aspect, the server system 114 may utilize two independent approaches for inferring 208 a textual answer 210 to a given question 202 from the page-wise pieces of text detected using OCR from the ESG report 204. Either method may provide a snippet 212 from which the textual answer is derived along with the textual answer itself 210. Snippet may generally include an excerpt or a small region of re-usable source code, machine code, or text in the page-wise pieces of text of the ESG report 204. A first approach produces deterministic results, and a second, alternative approach may be non-deterministic, although its outputs are mostly deterministic. The first approach for answer inference may be more accurate in scenarios where total consistency is needed in results generated, and the second approach may provide superior answer quality and may be used generally in various applications.

Figure 3:
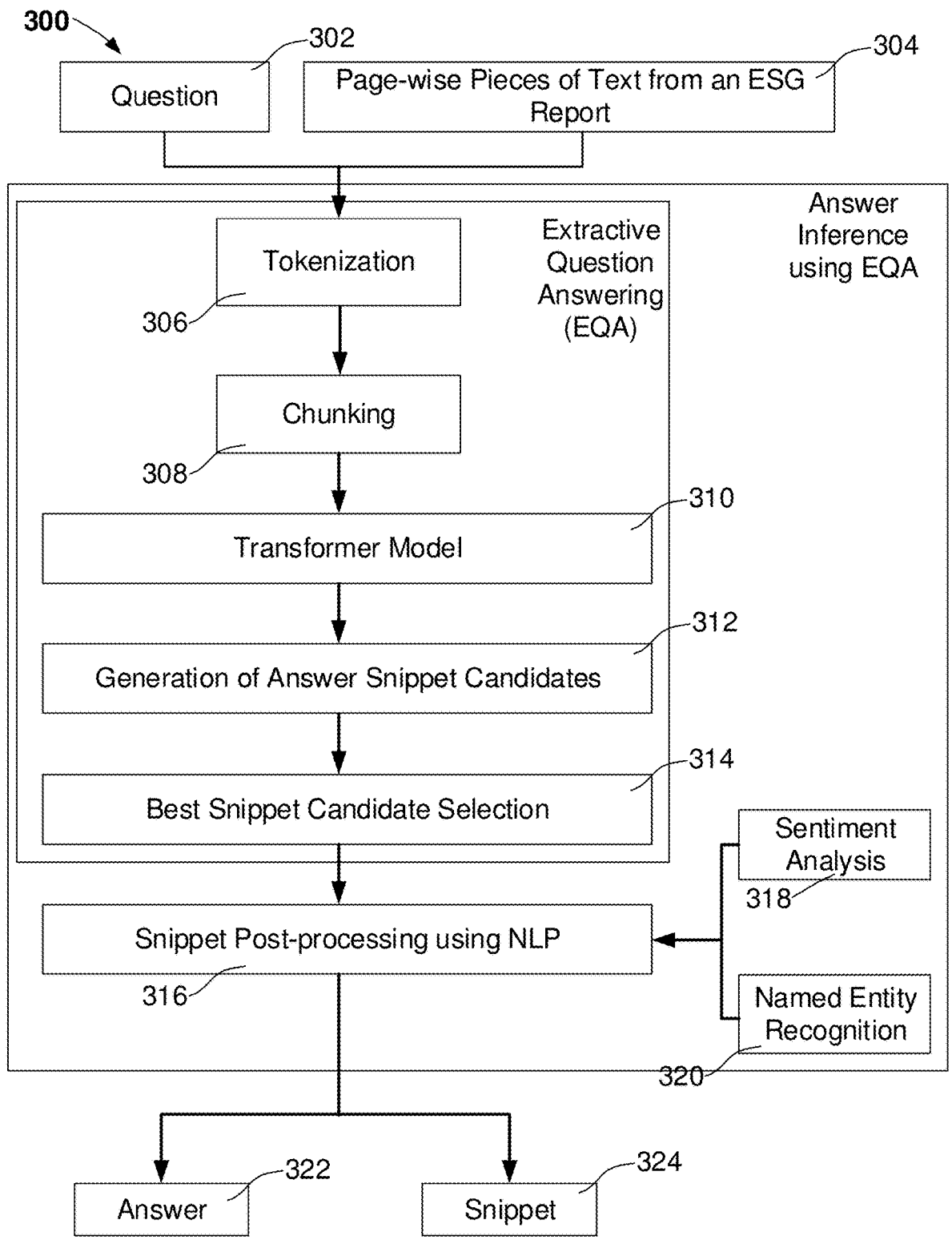
FIG. 3 illustrates a first method for answer inference using extractive question answering (EQA), according to an exemplary aspect of the present disclosure.

Referring to FIG. 3, a first computer-implemented method 300 may be used for the generation of an answer 322 to an input question 302 from an ESG report (e.g., page-wise pieces of text detected using OCR from an ESG report 304) and an associated snippet 324 using EQA, in accordance with aspects of the present disclosure. A key component of EQA may comprise identifying answers as spans (snippets) of text in a document. The objective of this step is to extract a snippet from a relevant document providing the final answer. In a preferred embodiment, a transformer model may be pre-trained on a large corpus of English texts in a self-supervised fashion and subsequently fine-tuned on a labeled EQA dataset. The transformer model refers to a neural network that learns context and meaning by tracking relationships in sequential data (e.g., sequential text, image or video data). The transformer model of the present disclosure may be configured to take a question 302 and the concatenation of the page-wise pieces of text of the ESG report 304 (from which to extract the snippet 324 providing the answer 322) together as the inputs.

In one aspect, the transformer model may use a tokenizer (tokenization 306) to partition the question 302 and the ESG report 304 into tokens, which are sub-words. That is, the transformer model may be configured to encode a character sequence and a defined document unit into transformer readable tokens. In an embodiment, the tokenizer inserts a special token between the sets of tokens of the question 302 and the ESG report 304 to separate them and transforms the inputs into a sequence of tokens.

The transformer model of the present disclosure may impose limits on the length of an input sequence. Since most ESG reports are substantially longer than these limits, they cannot be directly input into a general transformer model. In one aspect, the server system 114 of the present disclosure may be configured to truncate an input ESG report 304 to the maximum length permissible, but it may result in the loss of a part of the snippet providing the answer in certain situations. Alternatively, the server system 114 of the present disclosure may be configured to divide (chunking 308) any input sequence greater than the maximum length supported by the transformer model into subsequences (hereinafter "chunks"), each shorter than the maximum length, such that a pre-trained transformer model may be applied on each subsequence separately. In order to reduce the possibility of the snippet providing the answer being split across chunks and hence not being fully extracted, the server system 114 of the present disclosure may introduce some overlap between consecutive chunks.

The chunks, which are sequences of tokens, generated through the previous step may be individually input into the pre-trained transformer model 310 of the present disclosure. In one embodiment, the transformer model may produce two sets of scores as an output. One set may provide the score for the likelihood of each token being the start token of the snippet 324. The other set may contain the score for the likelihood of each token being the end token of the snippet 324.

In some implementations, the transformer model may be a bidirectional encoder representations from transformers (BERT) model pre-trained using self-supervision and then fine-tuned for EQA. The dataset used for the task-specific fine-tuning may include a Stanford Question Answering Dataset (SQUAD), which contains question-answer-document triplets where the documents are Wikipedia articles and the answer to every question is a segment of text from the corresponding document unless the question is unanswerable from the document.

To generate answer snippet candidates 312, in one embodiment, the server system 114 of the present disclosure may be configured to determine and shortlist a first selected group of the start token candidates (e.g., the top 20 tokens with the highest start token scores) and a second selected group of the end token candidates (e.g., the top 20 tokens with the highest end token scores). Next, a number of answer snippet candidates (e.g., 400 candidates) may be generated by pairing each start token candidate with each end token candidate. The server system 114 may filter out snippet candidates that are not fully covered by the tokens of the ESG report. Moreover, a question category based candidate rejection may be performed by the server system 114. An example of the question categories is the numeric category; the questions falling in this category must have answers containing at least one number.

In order to determine the best snippet candidate selection 314, the server system 114 may be configured to calculate a score for each snippet candidate, which is represented by the corresponding start and end token candidates, and identify the snippet candidate with the highest score as the snippet answering the question 302. In one aspect, the score for a snippet candidate may be calculated as the sum of the score obtained from the transformer model for its start token candidate and the counterpart for the end token candidate. If no candidate remains after all the filtering, no snippet may be extracted. If a snippet is identified, the server system 114 may be configured to locate the page in the ESG report 304 that contains it using the snippet indices in the concatenated report text and the lengths of all pages.

In some cases, the snippet extracted through the aforementioned steps may be a provisional snippet, and is not always the desired final answer to the question of interest. The server system 114 may be further configured to perform snippet post-processing using e.g., NLP techniques 316. For example, the server system 114 may identify categories of questions for which the answer may differ from the snippet and process the snippet to generate the answer for each category. For some of these categories, the server system 114 may determine a snippet different from the provisional snippet as the snippet providing the answer at least because the right snippet is subsequently located in the image form of the ESG report 304 to highlight where the answer came from.

Binary questions may be divided into two categories, in accordance with aspects of the present disclosure. The first category may deal with whether a company received fines for regulation violations, has certain environmental targets, or is equipped with certain systems. For these questions, the server system 114 of the present disclosure may be configured to perform a sentiment analysis or prediction 318 on the snippet to infer the answer at least because a negative sentiment may serve as a good proxy for negation in this case and may be identified more robustly than negation. In a preferred embodiment, a pre-trained transformer based model (e.g., distilBERT) may be used by the server system 114 to fine-tune on a sentiment analysis dataset called the Stanford Sentiment Treebank. The server system 114 may use the model to provide the probabilities for the positive and negative sentiment labels. The label with the highest probability may be determined as the sentiment label for the snippet 324, which constitutes the binary answer to the question 322.

The second category of binary questions relates to whether a company has a policy on a matter such as human rights and anti-corruption. The server system 114 may determine a "Yes" as the answer if a snippet was successfully extracted and a "No" otherwise. In some embodiments, a sentiment analysis may not be performed by the server system 114 at least because the presence of negation or negative sentiment in the snippet extracted for a question of this category does not necessarily imply a negative answer. For example, the negation may be a part of the policy itself (e.g., "We do not employ a minor in any capacity.") and may not indicate the absence of a policy of the matter.

Furthermore, the server system 114 may use a number of single-question categories involving the post-processing of the snippet 324. One example is for the question seeking the address of the company headquarters. The server system 114 may be configured to search an address using a combination of named entity recognition (NER) 320 and regular expressions in a window around the snippet as well in the textual contents of the first and last pages of the ESG report 304. In order to identify an address, the server system 114 may first identify all entities tagged as geopolitical entities and order them from left to right in the input context. For each geopolitical entity, the server system 114 may merge the next geopolitical entity with it, if there is no alphanumeric character between the two in the context. The server system 114 may then check for an address from a window around the (extended) entity using regular expressions for different address components including the zip code and street name. If an address is found in any of the three contexts, it is determined by the server system 114 as the desired headquarters address. If not, the snippet 324 is selected as the headquarters address.

Figure 4:
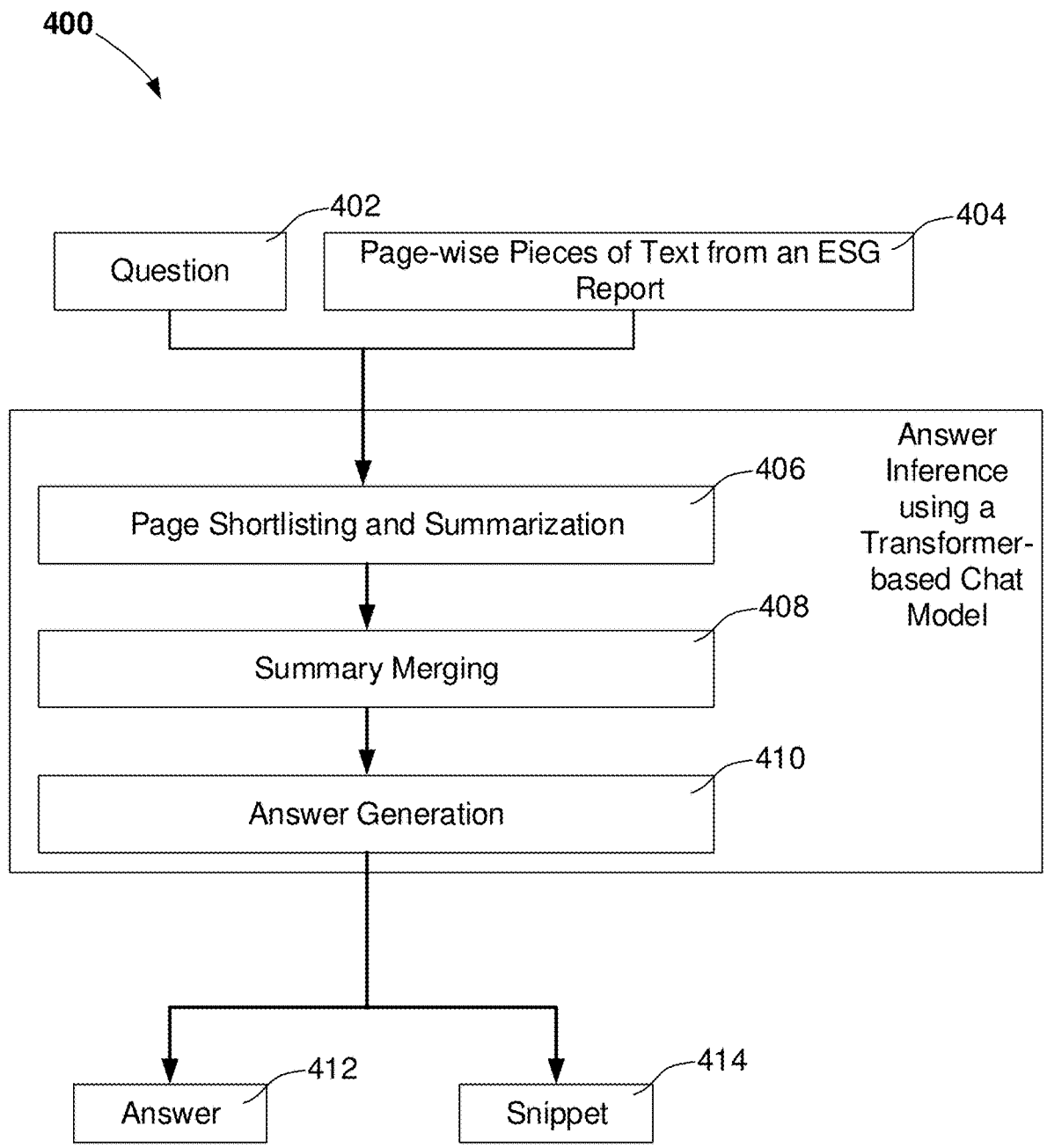
FIG. 4 illustrates a second method for answer inference using a transformer based model, according to an exemplary aspect of the present disclosure.

In accordance with another aspect of the present disclosure, FIG. 4 shows a second computer-implemented method 400 for inferring a textual answer 412 to a question 402 from an ESG report (e.g., page-wise pieces of text detected using OCR from an ESG report 404) and a corresponding snippet 414 based on a pre-trained transformer-based chat model. For example, the transformer model of the present disclosure may be configured to learn how to apply an appropriate context in answering the question 402. When processing a sentence, the meaning of a word or a phrase may change based on the context in which it is being used. The server system 114 may be configured to apply the appropriate context as a function of grammar and a function of the relationship that exists in the real-world in a data-driven way. Further, the system 100 of the present disclosure may be configured to carry out parallelization of computing during training as well as inference.

In one embodiment, ChatGPT-3.5 from OpenAI may be utilized by the system 100 of the present disclosure. Specifically, the system 100 may provide a textual prompt to the transformer-based chat model and receive a textual response. All OpenAI chat models are non-deterministic. The server system 114 of the system 100 may set a tunable parameter of the GPT-3.5 model, such that all responses produced by the model are maximally deterministic.

In an embodiment, answer inference may be carried out using a chat model to concatenate the text across pages and query the transformer model to answer the given question from the resulting text via a prompt.

In another embodiment, since it may be difficult to directly include lengthy inputs from an ESG report in a prompt of a chat model, the server system 114 may be configured to first perform page shortlisting and summarization 406. This step has two objectives: the identification of the pages containing information that can help answer the question, and the extractive summarization of each helpful (shortlisted) page keeping in mind the question answering goal. Each of these objectives serves the goal of minimizing the length of the text representing the ESG report 404 for the question answering purpose, such that it can be input to the transformer-based chat model in a single prompt for generating the answer 412.

In one preferred embodiment, instead of fulfilling the aforementioned two objectives of step 406 sequentially by processing each page twice, the system 100 may be configured to perform page shortlisting and summarization simultaneously. For example, in order to generate a question-relevant extractive summary of a page, the server system 114 of the system 100 may extract the part of the page providing the answer 412 to the question 402. For each page, the server system 114 may query the transformer-based chat model, via a single prompt, to provide the answer 412 to the question 402 and the part of the text providing the answer 412 from the page text. The transformer-based chat model may output "Not found" as the answer 412, if the page's text does not provide any information about the question 412.

In some implementations, the server system 114 may request the transformer-based chat model to provide a JSON object with keys corresponding to the answer 412 and the part of the text as a response. Such a structured response may make parsing the response to extract the different pieces of information easier and more reliable and may also improve the response quality. The server system 114 may use regular expressions to extract the values of the JSON keys from the transformer-based chat model response to determine the answer 412 and the part of the text answering the question 412. The rationale behind querying the model to provide the answer 412 despite the fact the answer 412 may be not sought or used is that it may lead to chain-of-thought prompting and thereby improving the model's efficacy in identifying the part of the text providing the answer 412. The server system 114 may shortlist each page for which the answer generated by the model is "Not found." The part of the text answering the question serves as the summary of each shortlisted page.

Thereafter, the server system 114 may create an overall report summary (summary merging 408) from the summaries of the shortlisted pages in the following manner. The server system 114 may start with a blank report summary, and then begin processing the summaries of the shortlisted pages in the order in which the pages are found in the report (starting from the top-most shortlisted age). For each summary, the server system 114 may add the summary followed by pre-defined separation characters to the report summary if this addition will not make the report summary exceed a word count threshold. Otherwise, the server system 114 may stop processing the summaries. The word count threshold may be calculated on the basis of the model's token limit, an estimate of the average number of tokens per word, and an estimate of the average answer word count.

For answer generation 410, the server system 114 may request the transformer-based chat model, via a single prompt, to provide the answer 412 to the question 402 and the snippet 414 providing the answer 412 from the report summary generated previously as part of a JSON object. However, despite the measures taken to limit the size of the report summary, the prompt may exceed the model's token limit in certain cases. If that occurs, the server system 114 may calculate a reduced word limit for the report summary on the basis of the ratio of the model's token limit and the number of tokens found in the prompt among other factors. The server system 114 may start removing the page summaries from the report summary in the order opposite to the order in which they were added and stop when the report summary is within the reduced word limit. This process may be repeated one more time, if needed. The server system 114 may subsequently extract the final answer 412 and the snippet 414 providing the answer 412 from the model response comprising a JSON object using regular expressions.

Next, the server system 114 may be configured to identify the page that contains the snippet 414 providing the answer 412. The answer 412 may be used along with the snippet itself 414 to do so. The server system 114 may sort the shortlisted pages based on the length of the longest common substring between the snippet 414 and the summary of each page generated. The server system 114 may then eliminate each page whose summary does not have at least a one-word overlap with the answer 412. If no page is left, the server system 114 may determine the first page from the pre-elimination sorted list as the desired page. Otherwise, the first page in the sorted list of remaining pages may be identified as the desired page. The server system 114 may modify the snippet 414 as the longest common substring between it and the summary of the chosen page.

Referring back to FIG. 2, to determine the snippet location 212, the server system 114 may first extract the page of the ESG report that contains the snippet as an image. In one embodiment, the server system 114 may use OCR to convert the page image into text and keep track of the minimum bounding boxes of all the word occurrences recognized during the OCR process. One word may occur multiple times in the page at different locations. The minimum bounding box of a word occurrence may be represented by the image coordinates of the left-top corner of the word occurrence as well as the height and width of the word in the image.

The sequence of words in the snippet is a subsequence of the sequence of words generated by OCR from the page, assuming that the OCR used to convert the entire report PDF into text (from which the snippet was extracted) generates text in the same order as the OCR used on the page here. In one aspect, the server system 114 may be configured to match the snippet in the page text and identify all the word occurrences corresponding to the snippet. For each word occurrence $w_i$ ($0<=i<$ the snippet word length), let ($x_i$, $y_i$) be the coordinates of the left-top corner of the word occurrence. Denoting the width and height of $w_i$ by $l_i$ and $h_i$, the coordinates of the right-bottom corner are ($x_i+l_i-1$, $y_i+h_i-1$). The server system 114 may be configured to determine that a rectangle whose left-top corner's coordinates are (min ([$x_i$]), min ([$y_i$])) and whose right-bottom corner's coordinates are (min([$x_i+l_i-1$]), min ([$y_i+h_i-1$])) as the minimum bounding box of the snippet. The server system 114 may expand this rectangle by a small percentage of the maximum of the page height and page width to generate a final bounding box through which the snippet is highlighted. The server system 114 may further expand this bounding box on the basis of the page height and page width to arrive at the part of the page that shows as an image. The server system 114 may crop out 214 the rest of the page and display the bounding box as a rectangle around the snippet in this cropped image.

Referring to FIG. 5, a number of questions may be selected from the datasets of TABLE 1 with answers generated by the approach using EQA for answer inference, as described above with respect to FIG. 3. For example, the system 100 of the present disclosure may receive a question 502 (Scope 1 GHG emissions) and a report 504 (Alaska_2020.pdf) as inputs. The server system 114 may process the report 504 to generate page-wise pieces of text via, e.g., OCR techniques or any suitable technologies and/or techniques (e.g., pattern recognition, machine learning, artificial intelligence algorithms etc.). Subsequently, the server system 114 may be configured to perform the computer-implemented EQA method 300 of FIG. 3 to generate a textual answer 506 (5,936,459 Metric tons CO2e) to the question 502 and cropped pages highlighting the answer-providing snippets 508 (where the answer 506 is inferred from) located by the EQA method. As another example, the system 100 may be configured to process other reports 510, 512, automatically generate and locate an answer 514, 516 to a question 518, 520 from the reports 510, 512, and highlight corresponding answer-providing snippets 522, 524, respectively, via the disclosed EQA method.

Referring to FIG. 6, a number of questions may be selected from the datasets of TABLE 1 with answers generated by a pre-trained transformer-based chat model for answer inference, as described above with respect to FIG. 4. For example, the system 100 of the present disclosure may receive a question 602 (Geographic Locations) and a report 604 (CF Industries 2020.pdf) as inputs. The server system 114 may process the report 604 to generate page-wise pieces of text via, e.g., OCR techniques or any suitable technologies and/or techniques (e.g., pattern recognition, machine learning, artificial intelligence algorithms etc.). Subsequently, the server system 114 may be configured to perform the computer-implemented method 400 of FIG. 4 to generate a textual answer 606 (The company operates in the United States, Canada, and the United Kingdom.) to the question 602 and cropped pages highlighting the answer-providing snippets 608 (where the answer 606 is inferred from) located by the method 400. As another example, the system 100 may be configured to process other reports 610, 612, automatically generate and locate an answer 614 (answer type: Yes/No), 616 (answer type: number) to a question 618, 620 from the reports 610, 612, and highlight corresponding answer-providing snippets 622, 624, respectively, via the disclosed method 400.

In some embodiment, the server system 114 (e.g., Cloud-based or an on-site server) of the present disclosure may be configured to connect with various data sources or services 116a, 116b, 116c, . . . 116n (e.g., third party data sources) to identify and retrieve relevant reports for answering a received question.

Figure 7:
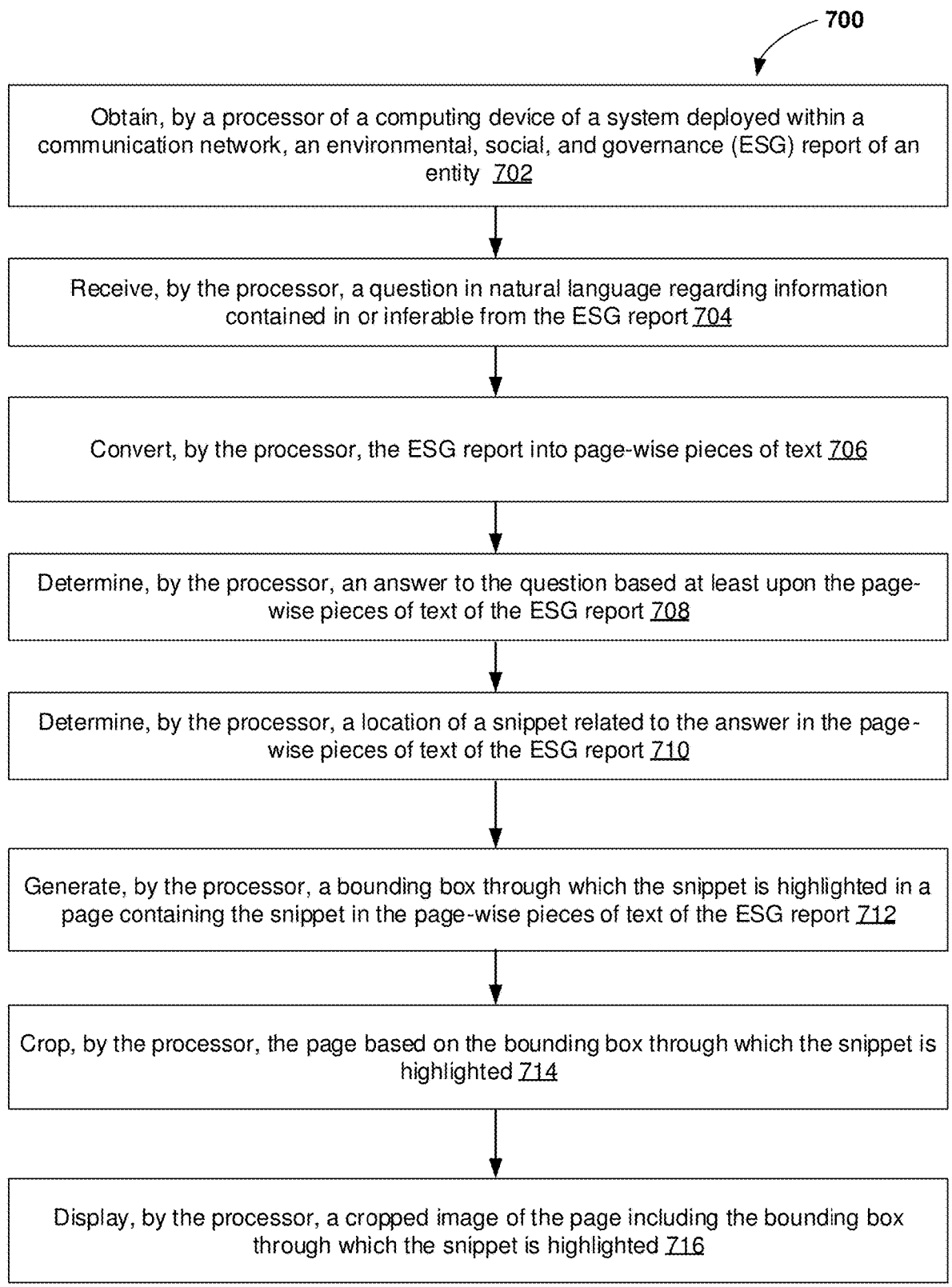
FIG. 7 illustrates a flowchart of a method carried out by the computing system of FIG. 1 for automatically generating, locating and highlighting an answer to a question from an ESG report, according to an exemplary aspect of the present disclosure.

According to aspects of the present disclosure, FIG. 7 illustrates a flowchart of a method 700 for automatically generating, locating and highlighting an answer to a question from an ESG report. The method 700 may comprise obtaining (702), by a processor of a computing device of a system deployed within a communication network an ESG report of an entity; receiving (704) a question in natural language regarding information contained in or inferable from the ESG report; converting (706) the ESG report into page-wise pieces of text; determining (708) an answer to the question based at least upon the page-wise pieces of text of the ESG report; determining (710) a location of a snippet related to the answer in the page-wise pieces of text of the ESG report; generating (712) a bounding box through which the snippet is highlighted in a page containing the snippet in the page-wise pieces of text of the ESG report; cropping (714) the page based on the bounding box through which the snippet is highlighted; and displaying (716) a cropped image of the page including the bounding box through which the snippet is highlighted.

Unless specifically stated otherwise as apparent from the foregoing disclosure, it is appreciated that, throughout the present disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

As used herein, the term "comprising" is not intended to be limiting, but may be a transitional term synonymous with "including," "containing," or "characterized by." The term "comprising" may thereby be inclusive or open-ended and does not exclude additional, unrecited elements or method steps when used in a claim. For instance, in describing a method, "comprising" indicates that the claim is open-ended and allows for additional steps. In describing a device, "comprising" may mean that a named element(s) may be essential for an embodiment or aspect, but other elements may be added and still form a construct within the scope of a claim. In contrast, the transitional phrase "consisting of" excludes any element, step, or ingredient not specified in a claim. This is consistent with the use of the term throughout the specification.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material. None is admitted to be prior art.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

The invention claimed is:

1. A system deployed within a communication network, the system comprising:
   a computing device, comprising:
   a non-transitory computer-readable storage medium storing instructions; and
   a processor coupled to the non-transitory computer-readable storage medium and configured to execute the instructions to:
      obtain an environmental, social, and governance (ESG) report of an entity,
      receive a question in natural language regarding information contained in or inferable from the ESG report,
      convert the ESG report into page-wise pieces of text,
      determine an answer to the question based at least upon the page-wise pieces of text of the ESG report by at least identifying one or more pages in the page-wise pieces of text containing information relating to the answer, generating a question-relevant extractive summary of each of the one or more pages, and providing the answer and the question-relevant extractive summary of each of the one or more pages to a pre-trained transformer-based chat model, via a single prompt, to determine a best snippet candidate related to the answer,
      determine a location of the best snippet candidate related to the answer in the ESG report,
      generate a bounding box through which the best snippet candidate is highlighted in a page containing the best snippet candidate in the ESG report by at least identifying first coordinates of a left-top corner of the best snippet, determining second coordinates of a right-bottom corner of the best snippet based on the first coordinates and a width and a height of a word occurrence of the best snippet, and expanding a rectangle defined by the first and second coordinates in connection with a selected percentage of a height and a width of the page to generate the bounding box,
      crop the page based on the bounding box through which the best snippet candidate is highlighted, and
      display a cropped image of the page including the bounding box through which the best snippet candidate is highlighted.

2. The system of claim 1, wherein the processor of the computing device is further configured to execute the instructions to analyze the question and determine a type of the answer to the question, wherein the type includes at least one of a textual answer, a numeric answer, and a binary answer.

3. The system of claim 2, wherein the processor of the computing device is configured to execute the instructions to convert the ESG report into the page-wise pieces of text via optical character recognition techniques.

4. The system of claim 2, wherein the processor of the computing device is configured to execute the instructions to determine the answer to the question by at least:
   using a tokenizer to transform the question and the page-wise pieces of text of the ESG report into a sequence of tokens;
   in response to detecting that a length of the sequence of tokens is greater than a selected threshold sequence length value of the system, dividing the sequence of tokens into subsequences, each subsequence being shorter than the selected threshold sequence length value;
   inputting the sequence of tokens or the subsequences into the pre-trained transformer-based chat model to generate a first score for a likelihood of each token being a start token of the snippet and a second score for a likelihood of each token being an end token of the snippet;
   generating answer snippet candidates based at least upon the first and second scores; and
   determining the best snippet candidate answering the question based at least upon the first and second scores.

5. The system of claim 4, wherein the processor of the computing device is configured to execute the instructions to generate the answer snippet candidates by filtering out candidates fail to match the type of the answer.

6. The system of claim 4, wherein the processor of the computing device is further configured to execute the instructions to perform a sentiment analysis on the best snippet candidate in response to detecting that the type of the answer is the binary answer by at least employing the pre-trained transformer model fine-tuned on a sentiment analysis dataset, calculate probabilities for positive and negative sentiment labels, and identify a sentiment label for a candidate snippet with a highest probability as the binary answer to the question.

7. The system of claim 4, wherein the processor of the computing device is further configured to execute the instructions to process the best snippet candidate via at least named entity recognition techniques.

8. The system of claim 1, wherein the processor of the computing device is configured to execute the instructions to determine the answer to the question by at least:

simultaneously identifying and extracting pages from the page-wise pieces of text of the ESG report containing information related to the question;

generating a JavaScript Object Notation (JSON) object with keys corresponding to the answer and texts in the pages answering the question;

generating an overall report summary of the pages as a part of the JSON object based on a selected word count threshold; and inputting the overall report summary to the pre-trained transformer-based chat model to generate the answer to the question and the best snippet candidate providing the answer.

9. The system of claim 8, wherein the selected word count threshold is determined based upon a token limit of the pre-trained transformer-based chat model.

10. The system of claim 8, wherein the processor of the computing device is further configured to execute the instructions to set a tunable parameter of the pre-trained transformer-based chat model in order to generate responses maximally deterministic.

11. The system of claim 1, wherein the processor of the computing device is further configured to execute the instructions to:

extract the page containing the best snippet candidate as an image; and convert the image into text while tracking minimum bounding boxes of all word occurrences corresponding to the best snippet candidate.

12. The system of claim 11, wherein the processor of the computing device is configured to execute the instructions to represent a minimum bounding box of each word occurrence based on image coordinates of a left-top corner of each word occurrence and a height and width of a sequence of words in each word occurrence in the image.

13. The system of claim 1, wherein the processor of the computing device is configured to execute the instructions to determine the answer to the question based at least upon the page-wise pieces of text of the ESG report by:

concatenating the one or more pages to generate an input text, and querying the pre-trained transformer-based chat model to answer the question based on the input text via the single prompt.

14. The system of claim 1, wherein the processor of the computing device is further configured to execute the instructions to perform summary merging of the question-relevant extractive summary of each of the one or more pages in accordance with a word count threshold of the pre-trained transformer-based chat model, wherein the word count threshold is determined based at least upon a token limit of the pre-trained transformer-based chat model, an estimate of an average number of tokens per word, and an estimate of an average answer word count.

15. A computer-implemented method, comprising:

obtaining, by a processor of a computing device of a system deployed within a communication network, an environmental, social, and governance (ESG) report of an entity;

receiving a question in natural language regarding information contained in or inferable from the ESG report;

converting the ESG report into page-wise pieces of text;

determining an answer to the question based at least upon the page-wise pieces of text of the ESG report by at least identifying one or more pages in the page-wise pieces of text containing information relating to the answer, generating a question-relevant extractive summary of each of the one or more pages, and providing the answer and the question-relevant extractive summary of each of the one or more pages to a pre-trained transformer-based chat model, via a single prompt, to determine a best snippet candidate related to the answer;

determining a location of the best snippet candidate related to the answer in the ESG report;

generating a bounding box through which the best snippet candidate is highlighted in a page containing the best snippet candidate in the ESG report by at least identifying first coordinates of a left-top corner of the best snippet, determining second coordinates of a right-bottom corner of the best snippet based on the first coordinates and a width and a height of a word occurrence of the best snippet, and expanding a rectangle defined by the first and second coordinates in connection with a selected percentage of a height and a width of the page to generate the bounding box;

cropping the page based on the bounding box through which the best snippet candidate is highlighted; and displaying a cropped image of the page including the bounding box through which the best snippet candidate is highlighted.

16. The computer-implemented method of claim 15, further comprising analyzing the question and determining a type of the answer to the question, wherein the type includes at least one of a textual answer, a numeric answer, and a binary answer.

17. The computer-implemented method of claim 16, further comprising converting the ESG report into the page-wise pieces of text via optical character recognition techniques.

18. The computer-implemented method of claim 16, wherein the determining the answer to the question comprises:

using a tokenizer to transform the question and the page-wise pieces of text of the ESG report into a sequence of tokens;

in response to detecting that a length of the sequence of tokens is greater than a selected threshold sequence length value of the system, dividing the sequence of tokens into subsequences, each subsequence being shorter than the selected threshold sequence length value;

inputting the sequence of tokens or the subsequences into the pre-trained transformer-based chat model to generate a first score for a likelihood of each token being a start token of the snippet and a second score for a likelihood of each token being an end token of the snippet;

generating answer snippet candidates based at least upon the first and second scores;

filtering out candidates fail to match the type of the answer; and determining the best snippet candidate answering the question based at least upon the first and second scores.

19. The computer-implemented method of claim 18, further comprising:

performing a sentiment analysis on the best snippet candidate in response to detecting that the type of the answer is the binary answer by at least employing the pre-trained transformer model fine-tuned on a sentiment analysis dataset;

calculating probabilities for positive and negative sentiment labels; and identifying a sentiment label for a candidate snippet with a highest probability as the binary answer to the question.

20. The computer-implemented method of claim 18, further comprising processing the best snippet candidate via at least named entity recognition techniques.

21. The computer-implemented method of claim 15, wherein the determining the answer to the question further comprises:
simultaneously identifying and extracting pages from the page-wise pieces of text of the ESG report containing information related to the question;
generating a JavaScript Object Notation (JSON) object with keys corresponding to the answer and texts in the pages answering the question;
generating an overall report summary of the pages as a part of the JSON object based on a selected word count threshold, wherein the selected word count threshold is determined based upon a token limit of the pre-trained transformer-based chat model; and
inputting the overall report summary to the pre-trained transformer-based chat model to generate the answer to the question and the best snippet candidate providing the answer.

22. The computer-implemented method of claim 21, further comprising setting a tunable parameter of the pre-trained transformer-based chat model in order to generate responses maximally deterministic.

23. The computer-implemented method of claim 15, further comprising:
extracting the page containing the best snippet candidate as an image;
converting the image into text while tracking minimum bounding boxes of all word occurrences corresponding to the best snippet candidate; and
representing a minimum bounding box of each word occurrence based on image coordinates of a left-top corner of each word occurrence and a height and width of a sequence of words in each word occurrence in the image.

24. A non-transitory computer readable medium storing instructions which when executed cause a processor of a computing device of a system deployed within a communication network to:
obtain an environmental, social, and governance (ESG) report of an entity;
receive a question in natural language regarding information contained in or inferable from the ESG report;
convert the ESG report into page-wise pieces of text;
determine an answer to the question based at least upon the page-wise pieces of text of the ESG report by at least identifying one or more pages in the page-wise pieces of text containing information relating to the answer, generating a question-relevant extractive summary of each of the one or more pages, and providing the answer and the question-relevant extractive summary of each of the one or more pages to a pre-trained transformer-based chat model, via a single prompt, to determine a best snippet candidate related to the answer;
determine a location of the best snippet candidate related to the answer in the ESG report;
generate a bounding box through which the best snippet candidate is highlighted in a page containing the best snippet candidate in the ESG report by at least identifying first coordinates of a left-top corner of the best snippet, determining second coordinates of a right-bottom corner of the best snippet based on the first coordinates and a width and a height of a word occurrence of the best snippet, and expanding a rectangle defined by the first and second coordinates in connection with a selected percentage of a height and a width of the page to generate the bounding box;
crop the page based on the bounding box through which the best snippet candidate is highlighted; and
display a cropped image of the page including the bounding box through which the best snippet candidate is highlighted.

25. The non-transitory computer readable medium of claim 24, further comprising instructions causing the processor to analyze the question and determine a type of the answer to the question, wherein the type includes at least one of a textual answer, a numeric answer, and a binary answer.

26. The non-transitory computer readable medium of claim 25, wherein the instructions cause the processor to determine the answer to the question by at least:
converting the ESG report into the page-wise pieces of text via optical character recognition techniques;
using a tokenizer to transform the question and the page-wise pieces of text of the ESG report into a sequence of tokens;
in response to detecting that a length of the sequence of tokens is greater than a selected threshold sequence length value of the system, dividing the sequence of tokens into subsequences, each subsequence being shorter than the selected threshold sequence length value;
inputting the sequence of tokens or the subsequences into the pre-trained transformer-based chat model to generate a first score for a likelihood of each token being a start token of the snippet and a second score for a likelihood of each token being an end token of the snippet;
generating answer snippet candidates based at least upon the first and second scores;
filtering out candidates fail to match the type of the answer; and
determining the best snippet candidate answering the question based at least upon the first and second scores.

27. The non-transitory computer readable medium of claim 26, further comprising instructions causing the processor to:
perform a sentiment analysis on the best snippet candidate in response to detecting that the type of the answer is the binary answer by at least employing the pre-trained transformer model fine-tuned on a sentiment analysis dataset;
calculate probabilities for positive and negative sentiment labels; and
identify a sentiment label for a candidate snippet with a highest probability as the binary answer to the question.

28. The non-transitory computer readable medium of claim 26, further comprising instructions causing the processor to process the best snippet candidate via at least named entity recognition techniques.

29. The non-transitory computer readable medium of claim 26, further comprising instructions causing the processor to:
extract the page containing the best snippet candidate as an image;
convert the image into text while tracking minimum bounding boxes of all word occurrences corresponding to the best snippet candidate; and represent a minimum bounding box of each word occurrence based on image coordinates of a left-top corner of each word occurrence and a height and width of a sequence of words in each word occurrence in the image.

30. The non-transitory computer readable medium of claim 24, wherein the instructions cause the processor to determine the answer to the question by at least:
  simultaneously identifying and extracting pages from the page-wise pieces of text of the ESG report containing information related to the question;
  generating a JavaScript Object Notation (JSON) object with keys corresponding to the answer and texts in the pages answering the question;
  generating an overall report summary of the pages as a part of the JSON object based on a selected word count threshold, wherein the selected word count threshold is determined based upon a token limit of a pre-trained transformer-based chat model;
  setting a tunable parameter of the pre-trained transformer-based chat model in order to generate responses maximally deterministic; and
  inputting the overall report summary to the pre-trained transformer-based chat model to generate the answer to the question and the best snippet candidate providing the answer.

\* \* \* \* \*